United States Patent Office 3,452,024
Patented June 24, 1969

3,452,024
5,6-DIHYDRO AND 1,2,3,4,5,6-HEXAHYDRO-8-ALKOXY - 9H - INDOLO - [2,3 - c]ISOQUINO[1,2 - f][1,2] AZAPHOSPHORINE 8-OXIDES AND PROCESS FOR THEIR PRODUCTION
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed July 28, 1966, Ser. No. 568,413
Int. Cl. C07d *105/02, 27/56;* A61k *27/00*
U.S. Cl. 260—288                                    6 Claims

ABSTRACT OF THE DISCLOSURE

Compounds of the following formulae are being claimed:

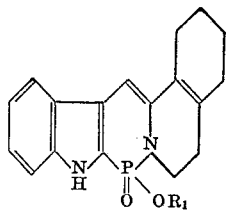

and

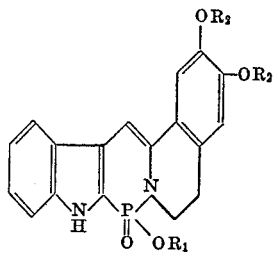

wherein $R_1$ and $R_2$ each represents lower alkyl. These compounds are used as central nervous system stimulants.

---

The present invention relates to new and novel 5,6-dihydro and 1,2,3,4,5,6-hexahydro-8-alkoxy-9H-indolo-[2,3-c]isoquino[1,2-f][1,2]azaphosphorine 8-oxides having the formulae:

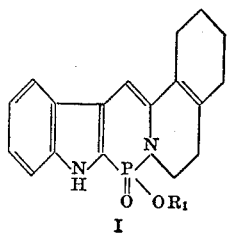

I and

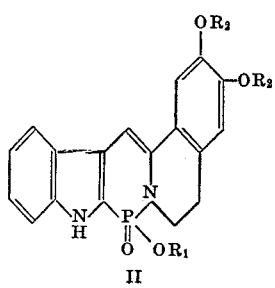

II wherein $R_1$ and $R_2$ each represents lower alkyl such as methyl, ethyl, propyl, butyl, isobutyl and the like. The symbols $R_1$ and $R_2$ have the same meaning as defined.

The compounds of this invention have the following numbering system:

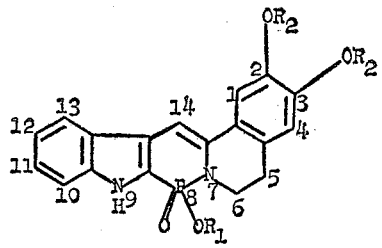

The compounds of this invention are useful as central nervous system stimulants. In order to use these compounds to produce the desired central nervous system stimulation, they are given at a dosage of about 1 to 100 mg. to an animal, orally or parenterally. The dosage regimen may be adjusted according to the requirements of the animal.

Compound I of this invention is prepared by reacting an amide of the formula:

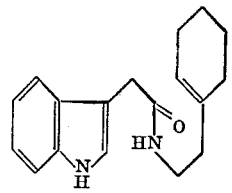

III whereas the compound of this invention of the Formula II above is prepared by treating an amide of the formula·

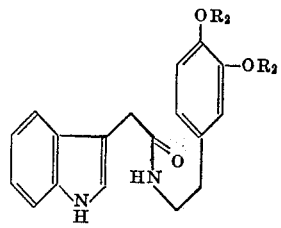

IV with phosphorous oxychloride at elevated temperature such as from about 60 to about 110° C. Treatment of the reaction product thus obtained with an aliphatic alcohol such as methyl, ethyl or isobutyl alcohol yields compounds of the structures I and II respectively.

The preparation of Formula IV is fully described in our copending application Ser. No. 540,512, whereas Formula III is fully described in our copending application Ser. No. 308,076 and now U.S. Patent No. 3,175,010.

The following examples are included in order further to illustrate the invention. All temperatures are given in degrees centigrade.

EXAMPLE 1

8-ethoxy-5,6-dihydro-2,3-dimethoxy-9H-indolo[2,3-c]isoquino-[1,2-f][1,2]azaphosphorine 8-oxide

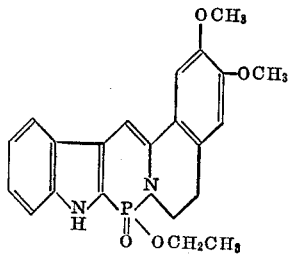

A solution of 15.0 g. of N-(3,4-dimethoxyphenethyl) indole-3-acetamide in 48 ml. of phosphorous oxychloride is refluxed for 20 hr. The reaction mixture is stripped in vacuo on the steam bath and the residue is treated with 100 ml. of ethanol giving a solid, M.P. 300°. A solution of the solid in 700 ml. of ethanol is refluxed for 2.5 hr. and then concentrated to 100 ml. On standing there is deposited the above compound as a crystalline solid, M.P. 285.5–286.5°.

*Analysis.*—Calcd. for $C_{22}H_{23}N_2O_4P$: C, 64.38; H, 6.65; N, 6.83; P, 7.55. Found: C, 64.36; H, 5.88; N, 6.71; P, 7.82.

EXAMPLE 2

8-ethoxy-1,2,3,4,5,6-hexahydro-9H-indolo[2,3-c]isoquino-[1,2-f][1,2]azaphosphorine 8-oxide

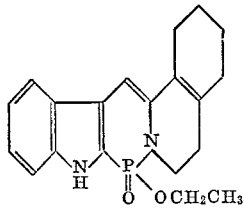

A solution of 50 g. of N-(cyclohexenylethyl)indole-3-acetamide in 175 ml. of phosphorous oxychloride is refluxed for 20 hr. The reaction mixture is stripped in vacuo on the steam bath. The residue is poured into with 300 ml. of ethanol and the mixture refluxed for 1 hr. On standing the solution deposits the above compound as a crystalline solid, M.P. 254–255°.

*Analysis.*—Calcd. for $C_{20}H_{23}N_2O_2P$: C, 67.78; H, 6.54; N, 7.90; P, 8.74. Found: C, 67.79; H, 6.46; N, 7.73; P, 8.61.

It is understood that the foregoing detailed description is given merely by way of illustration.

Having described our invention, what we desire to secure by Letters Patent is:

1. A compound of the formula:

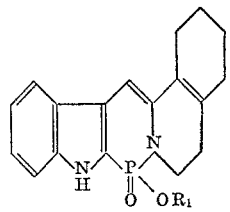

in which $R_1$ represents lower alkyl.

2. A compound of the formula:

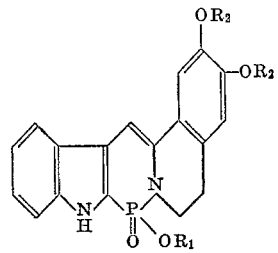

wherein $R_1$ and $R_2$ each represents lower alkyl.

3. 8-ethoxy-5,6-dihydro - 2,3 - dimethoxy - 9H - indolo [2,3-c]-isoquino[1,2-f][1,2]azaphosphorine 8-oxide.

4. 8-ethoxy-1,2,3,4,5,6-hexahydro - 9H - indolo[2,3-c]-isoquino[1,2-f][1,2]azaphosphorine 8-oxide.

5. Process for the production of the compound of claim 1 which comprises treating a compound of the Formula III with phosphorous oxychloride at a temperature of from about 60° C. to about 110° C. to obtain a reaction product, treating said reaction product with a lower aliphatic alcohol.

6. Process for the production of the compound of claim 2 which comprises treating a compound of the Formula IV with phosphorous oxychloride at a temperature of from about 60° C. to about 110° C. to obtain a reaction product, treating said reaction product with a lower aliphatic alcohol.

References Cited

UNITED STATES PATENTS 3,291,800   12/1966   Shavel et al. _____ 260—288

ALEX MAZEL, *Primary Examiner.*

A. M. TIGHE, *Assistant Examiner.*

U.S. Cl. X.R.

260—999